United States Patent
Huang

(10) Patent No.: US 9,225,888 B2
(45) Date of Patent: Dec. 29, 2015

(54) IMAGE CAPTURING ARRAY SYSTEM AND FINGERPRINT IDENTIFICATION DEVICE

(71) Applicant: LARGAN PRECISION CO., LTD., Taichung (TW)

(72) Inventor: Hsin-Hsuan Huang, Taichung (TW)

(73) Assignee: LARGAN PRECISION CO., LTD., Taichung (TW)

( * ) Notice: Subject to any disclaimer, the term of this patent is extended or adjusted under 35 U.S.C. 154(b) by 222 days.

(21) Appl. No.: 14/166,874

(22) Filed: Jan. 29, 2014

(65) Prior Publication Data

US 2015/0138331 A1    May 21, 2015

Related U.S. Application Data

(60) Provisional application No. 61/905,858, filed on Nov. 19, 2013.

(51) Int. Cl.
| | |
|---|---|
| *H04N 5/225* | (2006.01) |
| *G06K 9/22* | (2006.01) |
| *G06K 9/00* | (2006.01) |

(52) U.S. Cl.
CPC .......... *H04N 5/2258* (2013.01); *G06K 9/00046* (2013.01); *G06K 9/228* (2013.01); *H04N 5/2254* (2013.01)

(58) Field of Classification Search
CPC . G06K 9/00013; G06K 9/228; H04N 5/2258; H04N 5/2254
See application file for complete search history.

(56) References Cited

U.S. PATENT DOCUMENTS

2013/0050846 A1*    2/2013    Huang .................... G02B 9/62
359/713

* cited by examiner

*Primary Examiner* — Andy Rao
*Assistant Examiner* — Tyler Edwards
(74) *Attorney, Agent, or Firm* — CKC & Partners Co., Ltd.

(57) ABSTRACT

An image capturing array system includes, in order from an object side to an image side, at least two image lens units and at least one image sensor disposed on an image plane of each of the image lens units. Each of the image lens units includes at least one lens element with refractive power, an object-side surface and an image-side surface of the lens element are aspheric, and an object is relatively stationary with respect to the in lens units during an image capturing process.

20 Claims, 11 Drawing Sheets

IMAGE CAPTURING ARRAY SYSTEM AND FINGERPRINT IDENTIFICATION DEVICE

RELATED APPLICATIONS

The application claims priority to U.S. Provisional Patent Application No. 61/905,858 filed Nov. 19, 2013, which is herein incorporated by reference.

BACKGROUND

1. Technical Field

The present disclosure relates to an image capturing array system. More particularly, the present disclosure relates to a compact image capturing array system applicable to a mobile terminal.

2. Description of Related Art

An image scanner is a device that optically scans an image of an object surface and converts the image of the object surface into a digital image, such as a desktop scanner. A magnification of the desktop scanner equals to one, i.e. a size of an image equals to a size of an object. As a result, a volume of the desktop scanner is huge and unfavorable for being carried. Moreover, a cost of an image sensor of the desktop scanner is high.

With the popularity of mobile terminals, the functions of the mobile terminals are continuously improved so as to satisfy the demand of consumers. A conventional mobile terminal with an image scanning device is disclosed. The mobile terminal can be used to scan images. Furthermore, the mobile terminal can be integrated with fingerprint identification function. That means the owner of the mobile terminal can use a fingerprint thereof as the code of the mobile terminal so as to protect the permission and the personal privacy. However, the size of the mobile terminal is still too large, and the image distortion is excessive. Therefore, the mobile terminal cannot satisfy the requirements of compact size and high image quality.

Other conventional mobile terminal with a lens linear array of micro-lenses can reduce a size thereof. In a single scanning process, a partial image of the object surface captured by the lens linear array of micro-lenses is a narrow segment. The lens linear array of micro-lenses has to move with respect to the object so as to capture a complete image of the object surface. That means the mobile terminal obtains the complete image of the object surface by a plurality of sequential scanning processes. It is time-consuming, and a probability of misidentification is increased.

SUMMARY

According to one aspect of the present disclosure, an image capturing array system includes, in order from an object side to an image side, at least two image lens units and at least one image sensor. The image sensor is disposed on an image plane of each of the image lens units. Each of the image lens units includes at least one lens element with refractive power, an object-side surface and an image-side surface of the lens element are aspheric, and an object is relatively stationary with respect to the image lens units during an image capturing process. In each of the image lens units, when an object height of the image lens unit is YOB, an image height of the image lens unit is YRI, the lens element which is closest to the object is an first lens element, an axial distance between the object and an object-side surface of the first lens element along an optical axis is OL, an axial distance between the object-side surface of the first lens element and the image plane along the optical axis is TL, and a half of a maximal field of view of the image lens unit is HFOV, the following conditions are satisfied:

$2.0 \leq YOB/YRI$; and $(OL+TL)/\tan(HFOV) < 5$ mm.

According to another aspect of the present disclosure, fingerprint identification device includes the aforementioned image capturing array system and a light source. The light source is disposed between the object and the image plane of each of the image lens units.

BRIEF DESCRIPTION OF THE DRAWINGS

The disclosure can be more fully understood by reading the following detailed description of the embodiment, with reference made to the accompanying drawings as follows.

DETAILED DESCRIPTION

Image Capturing Array System

Figure 1:
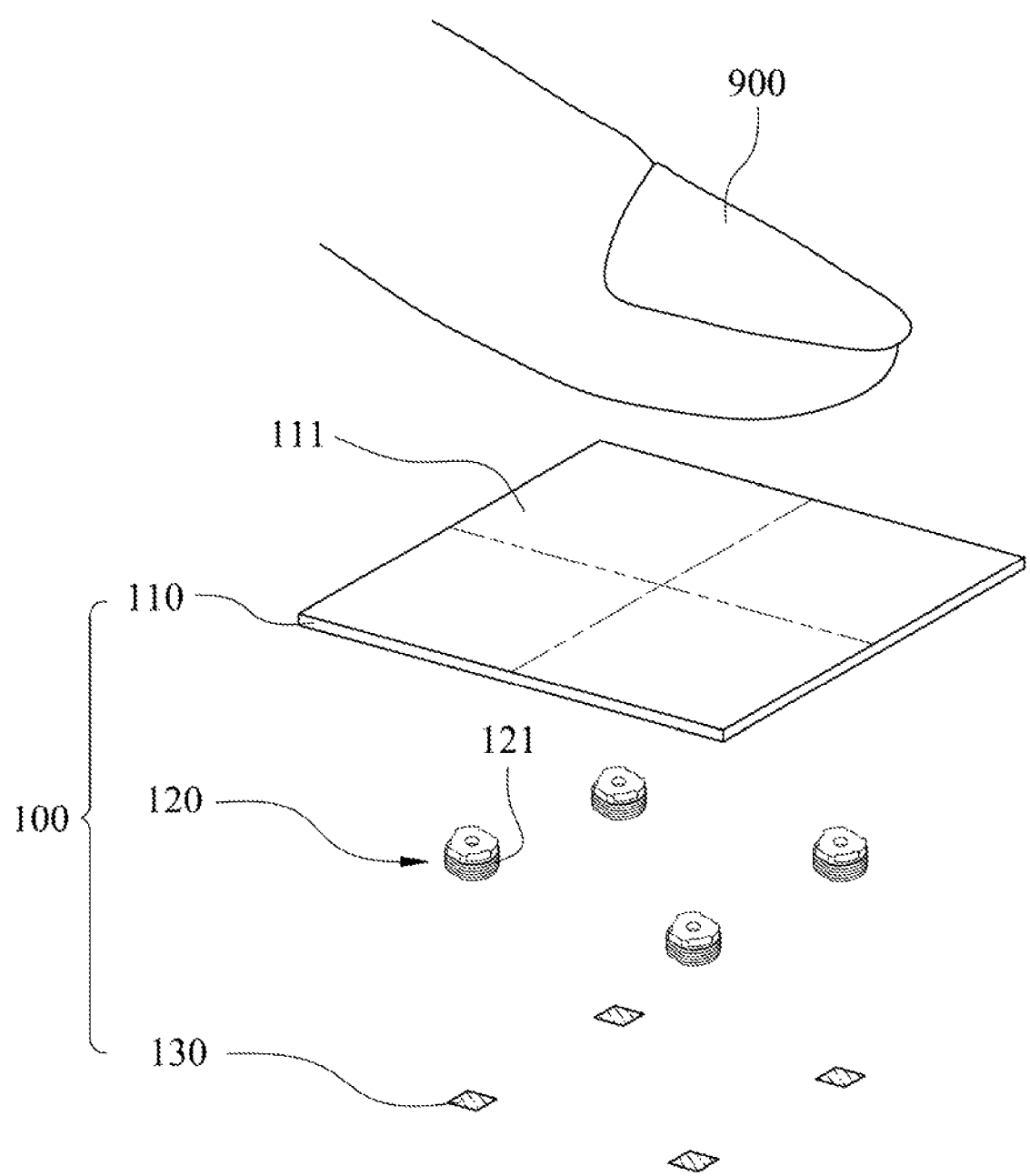
FIG. 1 is a schematic view of an image capturing array system according to the 1st embodiment of the present disclosure.

An image capturing array system includes, in order from an object side to an image side, at least two image lens units and at least one image sensor. The image sensor is disposed on an image plane of each of the image lens units. Each of the image lens units includes at least one lens element with refractive power, and an object-side surface and an image-side surface of the lens element are aspheric.

An object is relatively stationary with respect to the image lens units during an image capturing process. Instead of capturing a desired image range via a plurality of sequential image capturing processes, each of the image lens units can capture an image of a part of the object at the same time. Then the image capturing array system can obtain an image assembled of the images captured by the image lens units. In other words, the image capturing array system can obtain the desired image range via a single image capturing process. Therefore, the time for the image capturing array system to obtain the image with the desired image range is shorter, and an accuracy of the image is enhanced.

In each of the image lens units, when an object height of the image lens unit is YOB, and an image height of the image lens unit is YRI, the following condition is satisfied: $2.0<YOB/YRI$. Therefore, an area of the image sensor can be effectively reduced, and a cost thereof can be reduced.

In each of the image lens units, the lens element which is closest to the object is a first lens element. When an axial distance between the object and an object-side surface of the first lens element along an optical axis OL, an axial distance between the object-side surface of the first lens element and the image plane along the optical axis is TL, and a half of a maximal field of view of the image lens unit is HFOV, the following condition is satisfied: $(OL+TL)/\tan(HFOV)<5$ mm. Therefore, the image lens unit can be featured with a compact size and a large field of view.

The image capturing array system can include at least three image lens units, and the image lens units are arranged on a same plane as a two-dimensional array. Therefore, a captured range of the object can be broadened.

The two-dimensional array can be a matrix. When a number of columns of the matrix is X, and a number of rows of the matrix Y, the following conditions can be satisfied: $2 \leq X \leq 10$; and $2 \leq Y \leq 10$. Therefore, the number of the image lens units is proper. On one hand, the captured range of the object can be broadened, and the field of view of the image lens unit can be moderated so as to enhance the image quality. On the other hand, it is easier to manufacture the image capturing array system.

When an image area of each of the image lens units is Ai, and an overlapping image area between two of the image lens units is Aoi, the following condition can be satisfied: $(Aoi/Ai) \times 100\% \leq 20\%$. Therefore, there is a favorable balance between minimizing the total imaging area without increasing the difficulty of analyzing the produced raw image.

The image capturing array system can further include a hole piece with a two-dimensional through holes array arranged by a plurality of through holes, and each of the through holes is corresponded to each of the image lens units. Therefore, it is favorable for assembling the image capturing array system, and the alignment accuracy thereof can be enhanced.

Each of the image lens units can have at least one common element with the same functionality, and these identical common elements are formed into one unified piece. For an example, each of the image lens units has the first lens element, when the first lens elements are identical, the first lens element of each image lens units can be regarded as the common element, and the first lens elements are formed into one unified piece. Therefore, the manufacturing process can be simplified, and the manufacturing efficiency thereof can be enhanced.

Each of the image lens units can have two or three lens elements with refractive power. Therefore, there are enough surfaces of the lens element for correcting the aberration, and the total track length of the image capturing array system is not excessive.

In each of the image lens units, the image lens unit can further include a stop. When a focal length between the object and the stop is fF, and a focal length between the stop and the image plane is fR, the following condition can be satisfied: $-1.0<fR/fF<1.0$. For an example, each of the image lens units can include at least two lens elements with refractive power, and the stop is disposed between any two of the lens elements so as to classify the lens elements into a front lens group and a rear lens group. The front lens group is composed of at least one of the lens elements disposed between the object and the stop. The rear lens group is composed of at least one of the lens elements disposed between the stop and the image plane. The focal length of the front lens group is fF, and the focal length of the front lens group is fR. Therefore, the field of view of the image lens unit can be enlarged, and the incident angle of the main light on the image plane can be controlled. Furthermore, the principal point of the image lens unit can be positioned away from the object so as to enhance an incident range of the incident light of the image lens unit.

In each of the image lens units, when the axial distance between the object and the object-side surface of the first lens element along an optical axis is OL, and the axial distance between the object-side surface of the first lens element and the image plane along the optical axis is TL, the following condition can be satisfied: $OL+TL<5$ mm. Therefore, a size of the image capturing array system can be reduced.

In each of the image lens units, when a minimal distortion of the image lens unit is DISTmin, the following condition can be satisfied: $-3.5\%<DISTmin$. Therefore, an excessive contraction of the image can be avoided so as to maintain the identification degree of the image. Preferably, the following condition can be satisfied: $-3\%<DISTmin$.

In each of the image lens units, when an f-number of the image lens unit is Fno, the following condition can be satisfied: $4<Fno$. Thereof, the image quality of the image lens unit can be enhanced.

In each of the image lens units, when the half of the maximal field of view of the image lens unit is HFOV, the following condition can be satisfied: $45$ degrees$<HFOV$. Therefore, a larger image range of the image lens unit is obtained when the total track length of the image lens unit is shorter.

In each of the image lens units, an image-side surface of the lens element which is closest to the image plane has at least one inflection point. When a vertical distance between the inflection point on the image-side surface of the lens element and an optical axis is hp, and the object height of the image lens unit is YOB, the following condition can be satisfied: $0<hp/YOB<0.3$. Therefore, it is favorable for adjusting an off-axis distortion of the image lens unit.

The image capturing array system can further include an image capturing window. The image capturing window is defined by the imaging area of the image capturing array system. When a length of a minimal rectangular area circumscribing the image capturing window is L, and a width of the minimal rectangular area circumscribing the image capturing window is W, the following condition can be satisfied: $0.5<L/W<2$. Therefore, an identification range of the image of the image capturing array system can be optimized, so that the identification degree thereof is enhanced.

According to the image capturing array system of the present disclosure, the term "array" means that the image of the image capturing array system is assembled from at least two images captured by the image lens units, and the arrangement of the images captured by the image lens units is not limited to a matrix or other specific way.

According to the image capturing array system of the present disclosure, when the images captured by the image lens units are arranged as a matrix, that means the images are arranged to form straight lines in a transverse direction (i.e. to form rows) and in a longitudinal direction (i.e. to form columns) respectively. Each column of the matrix has the same number of the images, and each row of the matrix has the same number of the images.

According to the image capturing array system of the present disclosure, the image capturing array system can further include a cover piece, and the cover piece is disposed between the object and the image lens unit. The cover piece is for contacting with the object and for protecting the image capturing array system, such as protecting the image capturing array system from dirtiness. The cover piece can be but not limited to be planar. For example, the cover piece can be a cover-glass. During the image capturing process, the object is pressed close to the cover piece, so that the object is relatively stationary with respect to the image lens units or the image capturing array system. Therefore, the accuracy of the images captured by the image lens units can be enhanced.

According to the image capturing array system of the present disclosure, the image capturing window is defined by the imaging area of the image capturing array system, and the image capturing window can be a tangible element or an intangible element. When the image capturing window is a tangible element, the image capturing window can be established on a two-dimensional image plane, which provides high image clarity from all the required image details on the same image plane. When the image capturing window is an intangible element, the image capturing window can provide a user the convenience of a touch-less fingerprint identification experience.

According to the image capturing array system of the present disclosure, any two of the adjacent images captured by the image lens units can have no overlapping image area and are connected via the edges thereof. Any two of the adjacent images captured by the image lens units can have an overlapping image area.

According to the image capturing array system of the present disclosure, each of the image lens units can be axisymmetric, so that the symmetry of the image capturing array system is increased. Furthermore, the optical axis of each of the image lens units can be a single straight line, so that the configuration of the image capturing array system is simplified.

According to the image capturing array system of the present disclosure, the lens elements of the image lens units can be made of glass or plastic material. When the lens elements are made of glass material, the distribution of the refractive power of the image lens units may be more flexible to design. When the lens elements are made of plastic material, the manufacturing cost can be effectively reduced. Furthermore, surfaces of each lens element are arranged to be aspheric, since the aspheric surface of the lens element is easy to form a shape other than spherical surface so as to have more controllable variables for eliminating the aberration thereof, and to further decrease the required number of the lens elements. Therefore, the total track length of the image capturing array system can also be reduced.

According to the image capturing array system of the present disclosure, each of an object-side surface and an image-side surface has a paraxial region and an off-axis region. The paraxial region refers to the region of the surface where light rays travel close to the optical axis, and the off-axis region refers to the region of the surface where light rays travel away from the optical axis. Particularly, when the lens element has a convex surface, it indicates that the surface is convex in the paraxial region thereof; when the lens element has a concave surface, it indicates that the surface is concave in the paraxial region thereof.

According to the image capturing array system of the present disclosure, each of the image lens units can include at least one stop, such as an aperture stop, a glare stop or a field stop. Said glare stop or said field stop is for eliminating the stray light and thereby improving the image resolution thereof.

According to the image capturing array system of the present disclosure, an aperture stop can be configured as a front stop or a middle stop. A front stop disposed between an object and the first lens element can provide a longer distance between an exit pupil of the image lens unit and the image plane and thereby improves the image-sensing efficiency of the image sensor. A middle stop disposed between the first lens element and the image plane is favorable for enlarging the field of view of the image lens unit and thereby provides a wider field of view for the same.

The present image capturing array system can be optionally applied to moving focus optical systems. According to the image capturing array system of the present disclosure, the image capturing array system is featured with good correction ability and high image quality, and can be applied to 3D (three-dimensional) image capturing applications, in products such as digital cameras, mobile devices, digital tablets, wearable devices and other mobile terminals.

1st Embodiment of the Image Capturing Array System

FIG. 1 is a schematic view of an image capturing array system 100 according to the 1st embodiment of the present disclosure. In FIG. 1, the image capturing array system 100 includes, in order from an object side to an image side, a cover piece 110, four image lens units 120, and four image sensors 130. An object 900 is relatively stationary with respect to the image lens units 120 during an image capturing process.

The cover piece 110 is disposed between the object 900 and the image lens unit 120. The cover piece 110 has four sections 111, and the four sections 111 are corresponded to the four image lens units 120 respectively. In the embodiment, the four sections 111 are connected. In other embodiment, the four sections 111 can be independent. The cover piece 110 can be a cover-glass and can be utilized as a touch plate.

Each of the image lens units 120 includes at least one lens element (which is not shown in FIG. 1) with refractive power and a barrel 121. The lens element is received in the barrel 121. An object-side surface and an image-side surface of the lens element are aspheric. The image lens units 120 are arranged on a same plane as a two-dimensional array. Specifically, the images lens units 120 are arranged as a matrix, a number of columns of the matrix is 2, and a number of rows of the matrix is 2.

Each of the image sensors 130 is disposed on an image plane of each of the image lens units 120. The image sensors 130 are arranged as a two-dimensional array. Specifically, the image sensors 130 are arranged as a matrix, a number of columns of the matrix is 2, and a number of rows of the matrix is 2.

2nd Embodiment of the Image Capturing Array System

Figure 2:
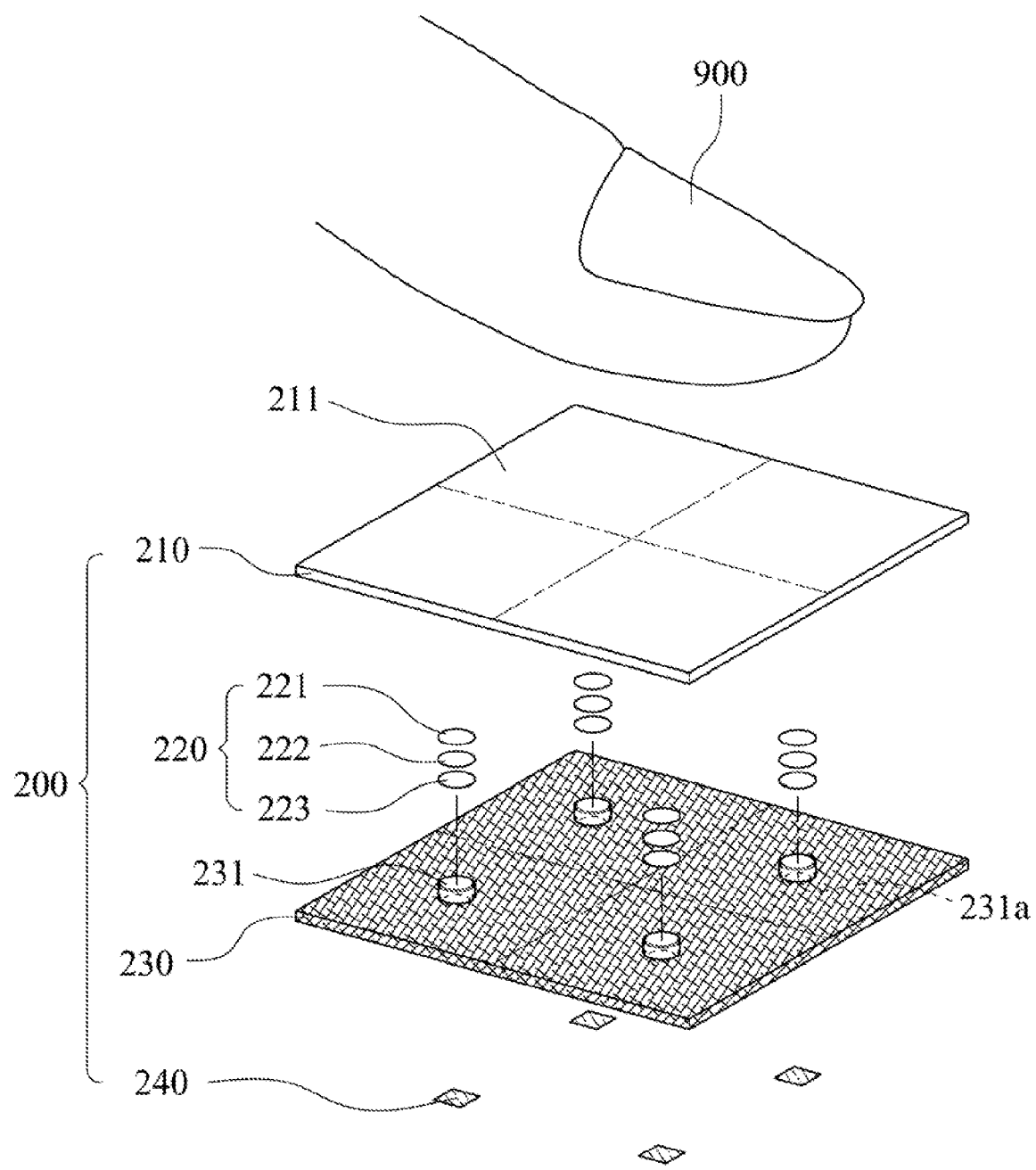
FIG. 2 is a schematic view of an image capturing array system according to the 2nd embodiment of the present disclosure.

FIG. 2 is a schematic view of an image capturing array system 200 according to the 2nd embodiment of the present disclosure. In FIG. 2, the image capturing array system 200 includes, in order from an object side to an image side, a cover piece 210, four image lens units 220, a hole piece 230 and four image sensors 240. An object 900 is relatively stationary with respect to the image lens units 220 during an image capturing process.

The cover piece 210 is disposed between the object 900 and the image lens unit 220. The cover piece 210 has four sections 211, and the four sections 211 are corresponded to the four image lens units 220 respectively. In the embodiment, the four sections 211 are connected. In other embodiment, the four sections 211 can be independent. The cover piece 210 can be a cover-glass and can be utilized as a touch plate.

Each of the image lens units 220 includes a first lens element 221 with refractive power, a second lens element 222 with refractive power and a third lens element 223 with refractive power. An object-side surface and an image-side surface of each of the first lens element 221, the second lens element 222 and the third lens element 223 are aspheric. The image lens units 220 are arranged on a same plane as a two-dimensional array. Specifically, the images lens units 220 are arranged as a matrix. A number of columns of the matrix is 2, and a number of rows of the matrix is 2.

The hole piece 230 has four barrel elements 231 for receiving the four image lens units 220 respectively, and each of the barrel elements 231 has a through hole 231a therein. In other words, the hole piece 230 has a two-dimensional through holes array arranged by the through holes 231a. Specifically, the through holes 231a of the hole piece 230 are arranged as a matrix, and each of the through holes 231a of the hole piece 230 is corresponded to each of the image lens units 220.

Each of the image sensors 240 is disposed on an image plane of each of the in lens units 220. The image sensors 240 are arranged as a two-dimensional array. Specifically, the image sensors 240 are arranged as a matrix, a number of columns of the matrix is 2, and a number of rows of the matrix is 2.

3rd Embodiment of the Image Capturing Array System

Figure 3:
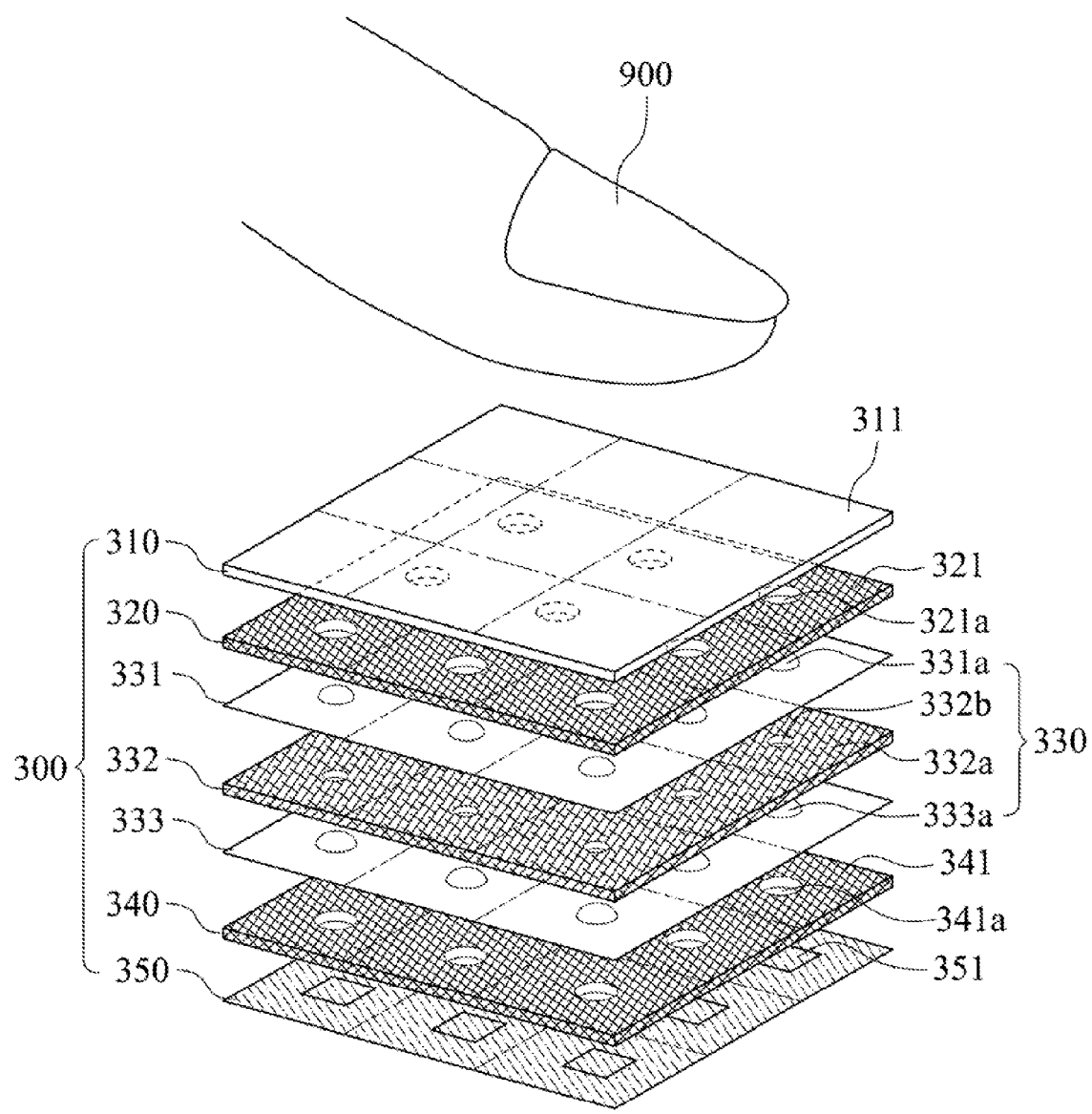
FIG. 3 is a schematic view of an image capturing array system according to the 3rd embodiment of the present disclosure.

FIG. 3 is a schematic view of an image capturing array system 300 according to the 3rd embodiment of the present disclosure. In FIG. 3, the image capturing array system 300 includes, in order from an object side to an image side, a cover piece 310, nine first spacer elements 321 nine image lens units 330, nine second spacer elements 341, and nine image sensors 351. Each of the image lens units 330 includes, in order from the object side to the image side, a first lens element 331a with refractive power, a through hole element 332a, and a second lens element 333a with refractive power. An object 900 is relatively stationary with respect to the image lens units 330 during an image capturing process.

The cover piece 310 is disposed between the object 900 and the image lens unit 330. The cover piece 310 has nine sections 311, and the nine sections 311 are corresponded to the nine image lens units 330 respectively. In the embodiment, the nine sections 311 are connected. In other embodiment, the nine sections 311 can be independent. The cover piece 310 can be a cover-glass and can be utilized as a touch plate.

Each of the first spacer elements 321 has a through hole 321a. The first spacer elements 321 are common and formed into a first hole piece 320. The first hole piece 320 is unified. The through holes 321a of the first hole piece 320 are arranged as a two-dimensional array. Specifically, the through holes 321a of the first hole piece 320 are arranged as a matrix, a number of columns of the matrix is 3, a number of rows of the matrix is 3, and the through holes 321a are corresponded to the image lens units 330.

An object-side surface and an image-side surface of the first lens element 331a are aspheric. The first lens elements 331a are common and formed into a first lens piece 331. The first lens piece 331 is unified, and the first lens elements 331a protrude from the first lens piece 331. The first lens elements 331a of the first lens piece 331 are arranged as a two-dimensional array. Specifically, the first lens elements 331a of the first lens piece 331 are arranged as a matrix, a number of columns of the matrix is 3, and a number of rows of the matrix is 3.

Each of the through hole elements 332a has a through hole 332b. The through hole elements 332a can be utilized as a stop, such as an aperture stop. The through hole elements 332a are common and formed into a second hole piece 332. The second hole piece 332 is unified. The through holes 332b of the second hole piece 332 are arranged as a two-dimensional array. Specifically, the through holes 332b of the second hole piece 332 are arranged as a matrix, a number of columns of the matrix is 3, a number of rows of the matrix is 3, and the through holes 332b are corresponded to the first lens elements 331a and the second lens elements 333a.

An object-side surface and an image-side surface of the second lens element 333a are aspheric. The second lens elements 333a are common and formed into a second lens piece 333. The second lens piece 333 is unified, and the second lens elements 333a protrude from the second lens piece 333. The second lens elements 333a of the second lens piece 333 are arranged as a two-dimensional array. Specifically, the second lens elements 333a of the second lens piece 333 are arranged as a matrix, a number of columns of the matrix is 3, and a number of rows of the matrix is 3.

Each of the second spacer elements 341 has a through hole 341a The second spacer elements 341 are common and formed into a third hole piece 340. The third hole piece 340 is unified. The through holes 341a of the third hole piece 340 are arranged as a two-dimensional array. Specifically, the through holes 341a of the third hole piece 340 are arranged as a matrix, a number of columns of the matrix is 3, a number of rows of the matrix is 3, and the through holes 341a are corresponded to the image lens units 330.

Each of the image sensors 351 is disposed on an image plane of each of the image lens units 330. The image sensors 351 are common and formed into a sensor piece 350. The sensor piece 350 is unified. The image sensors 351 of the sensor piece 350 are arranged as a two-dimensional array. Specifically, the image sensors 351 of the sensor piece 350 are arranged as a matrix, a number of columns of the matrix is 3, and a number of rows of the matrix is 3.

4th Embodiment of the Image Capturing Array System

Figure 4:
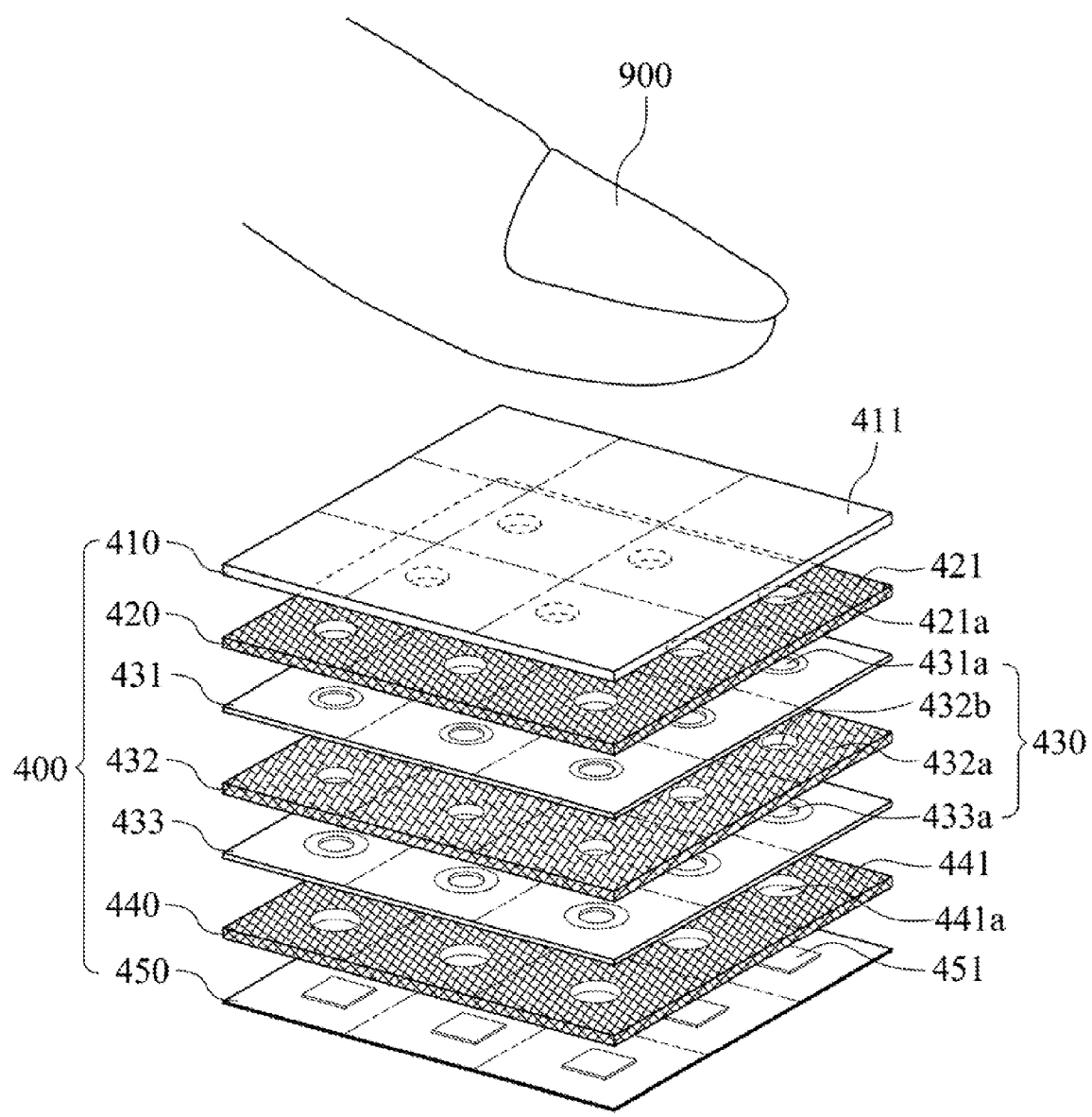
FIG. 4 is a schematic view of an image capturing array system according to the 4th embodiment of the present disclosure.

FIG. 4 is a schematic view of an image capturing array system 400 according to the 4th embodiment of the present disclosure. In FIG. 4, the image capturing array system 400 includes, in order from an object side to an image side, a cover piece 410, nine first spacer elements 421 nine image lens units 430, nine second spacer elements 441, and nine image sensors 451. Each of the image lens units 430 includes, in order from the object side to the image side, a first lens element 431a with refractive power, a through hole element 432a, and a second lens element 433a with refractive power. An object 900 is relatively stationary with respect to the image lens units 430 during an image capturing process.

The cover piece 410 is disposed between the object 900 and the image lens unit 430. The cover piece 410 has nine sections 411, and the nine sections 411 are corresponded to the nine image lens units 430 respectively. In the embodiment, the nine sections 411 are connected. In other embodiment, the nine sections 411 can be independent. The cover piece 410 can be a cover-glass and can be utilized as a touch plate.

Each of the first spacer elements 421 has a through hole 421a. The first spacer elements 421 are common and formed into a first hole piece 420. The first hole piece 420 is unified. The through holes 421a of the first hole piece 420 are arranged as a two-dimensional array. Specifically, the through holes 421a of the first hole piece 420 are arranged as a matrix, a number of columns of the matrix is 3, a number of rows of the matrix is 3, and the through holes 421a are corresponded to the image lens units 430.

An object-side surface and an image-side surface of the first lens element 431a are aspheric. The first lens elements 431a are common and formed into a first lens piece 431. The first lens piece 431 is unified, and the first lens elements 431a are depressed from the first lens piece 431. The first lens elements 431a of the first lens piece 431 are arranged as a two-dimensional array. Specifically, the first lens elements 431a of the first lens piece 431 are arranged as a matrix, a number of columns of the matrix is 3, and a number of rows of the matrix is 3.

Each of the through hole elements 432a has a through hole 432b. The through hole elements 432a can be utilized as s stop, such as an aperture stop. The through hole elements 432a are common and formed into a second hole piece 432. The second hole piece 432 is unified. The through holes 432b of the second hole piece 432 are arranged as a two-dimensional array. Specifically, the through holes 432b of the second hole piece 432 are arranged as a matrix, a number of columns of the matrix is 3, a number of rows of the matrix is 3, and the through holes 432b are corresponded to the first lens elements 431a and the second lens elements 433a.

An object-side surface and an image-side surface of the second lens element 433a are aspheric. The second lens elements 433a are common and formed into a second lens piece 433. The second lens piece 433 is unified, and the second lens elements 433a are depressed from the second lens piece 433. The second lens elements 433a of the second lens piece 433 are arranged as a two-dimensional array. Specifically, the second lens elements 433a of the second lens piece 433 are arranged as a matrix, a number of columns of the matrix is 3, and a number of rows of the matrix is 3.

Each of the second spacer elements 441 has a through hole 441a. The second spacer elements 441 are common and formed into a third hole piece 440. The third hole piece 440 is unified. The through holes 441a of the third hole piece 440 are arranged as a two-dimensional array. Specifically, the through holes 441a of the third hole piece 440 are arranged as a matrix, a number of columns of the matrix is 3, a number of rows of the matrix is 3, and the through holes 441a are corresponded to the image lens units 430.

Each of the image sensors 451 is disposed on an image plane of each of the image lens units 430. The image sensors 451 are common and formed into a sensor piece 450. The sensor piece 450 is unified. The image sensors 451 of the sensor piece 450 are arranged as a two-dimensional array. Specifically, the image sensors 451 of the sensor piece 450 are arranged as a matrix, a number of columns of the matrix is 3, and a number of rows of the matrix is 3.

Image Capturing Window

Figure 5A:
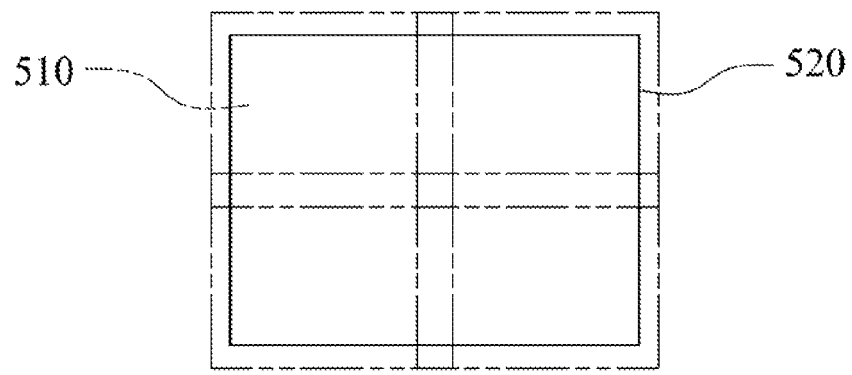
FIG. 5A is a schematic view shows a matrix of images and an image capturing window of the image capturing array system in FIG. 1.

FIG. 5A is a schematic view shows a matrix of images 510 and an image capturing window 520 of the image capturing array system 100 in FIG. 1. Each of the images 510 is captured by one of the image lens units 120. The images 510 are correspondently arranged as a matrix, a number of columns of the matrix is 2, and a number of rows of the matrix is 2. There is an overlapping image area between any two of the adjacent images 510. When an image area of the image 510 of each of the image lens units 120 is Ai, and an overlapping image area between two of the images 510 of two of the image lens units 120 is Aoi, the following condition is satisfied: (Aoi/Ai)×100%≤20%. The image capturing window 520 is defined by an imaging area of the image capturing array system. In other words, the area within the image capturing window 520 is the imaging area of the image capturing array system.

Figure 5B:
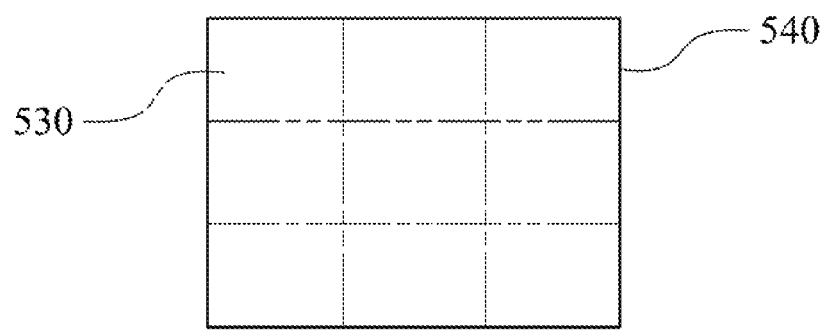
FIG. 5B is a schematic view shows a matrix of images and an image capturing window of the image capturing array system in FIG. 3.

FIG. 5B is a schematic view shows a matrix of images 530 and an image capturing window 540 of the image capturing array system 300 in FIG. 3. Each of the images 530 is captured by one of the image lens units 330. The images 530 are correspondently arranged as a matrix, a number of columns of the matrix is 3, and a number of rows of the matrix is 3. Each of the images 530 is connected with the adjacent images 530 via an edge thereof. In other words, there is no overlapping image area between any two of the adjacent images 530. When an image area of the image 530 of each of the image lens units 330 is Ai, and an overlapping image area between two of the images 530 of two of the image lens units 330 is Aoi, the following condition is satisfied: (Aoi/Ai)×100%=0%. The image capturing window 540 is defined by an imaging area of the image capturing array system. In other words, the area within the image capturing window 540 is the imaging area of the image capturing array system.

Figure 5C:
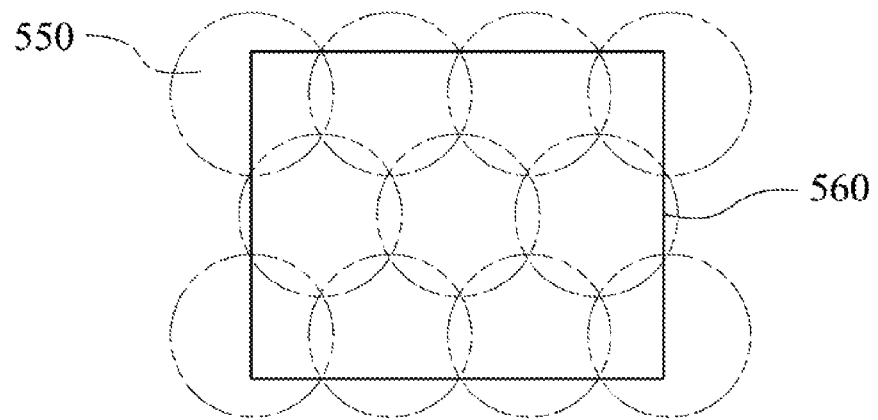
FIG. 5C is a schematic view shows a two-dimensional array of images and an image capturing window according to the present disclosure.

FIG. 5C is a schematic view shows a two-dimensional array of images 550 and an image capturing window 560 according to the present disclosure. An image capturing array system includes eleven image lens units. The image lens units are arranged on a same plane as a two-dimensional array. Each of the images 550 is captured by one of the image lens units. The images 550 are correspondently arranged as a two-dimensional array. There is an overlapping image area between any two of the adjacent images 550. When an image area of the image 550 of each of the image lens units is Ai, and an overlapping image area between two of the images 550 of two of the image lens units is Aoi, the following condition is satisfied: (Aoi/Ai)×100%≤20%. The image capturing window 560 is defined by an imaging area of the image capturing array system. In other words, the area within the image capturing window 560 is the imaging area of the image capturing array system.

Figure 6A:
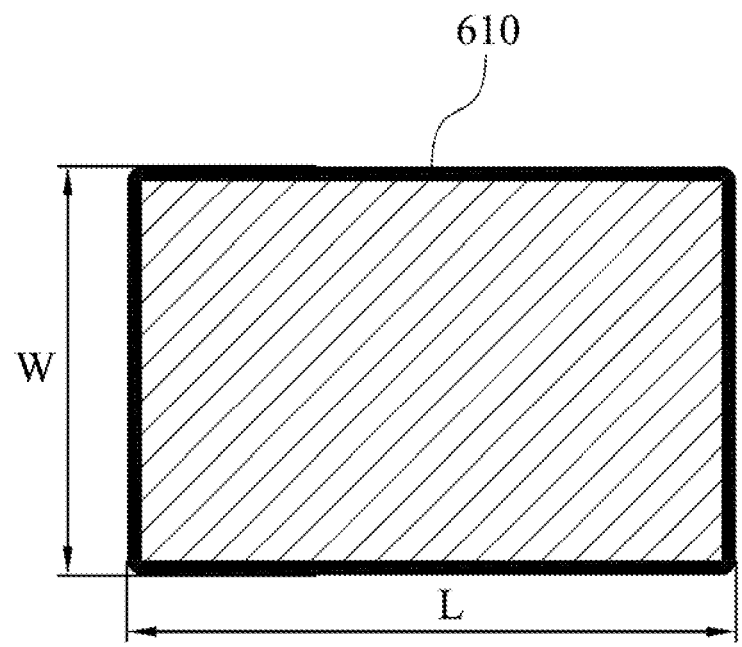
FIG. 6A shows L and W of an image capturing window according to the present disclosure.

FIG. 6A shows L and W of an image capturing window according to the present disclosure. The image capturing window 610 is a rectangle. L is a length of a minimal rectangular area circumscribing the image capturing window, and W is a width of the minimal rectangular area circumscribing the image capturing window.

Figure 6B:
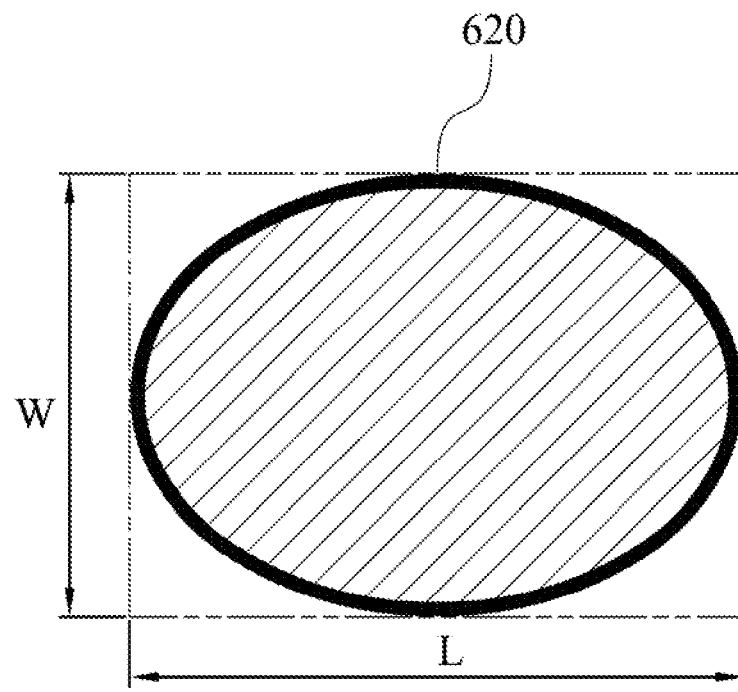
FIG. 6B is shows L and W of another image capturing window according to the present disclosure.

FIG. 6B is shows L and W of another image capturing window according to the present disclosure. The image capturing window 620 is an ellipse. L is a length of a minimal rectangular area circumscribing the image capturing window, and W is a width of the minimal rectangular area circumscribing the image capturing window.

1st Example of the Image Capturing Array System

Figure 7:
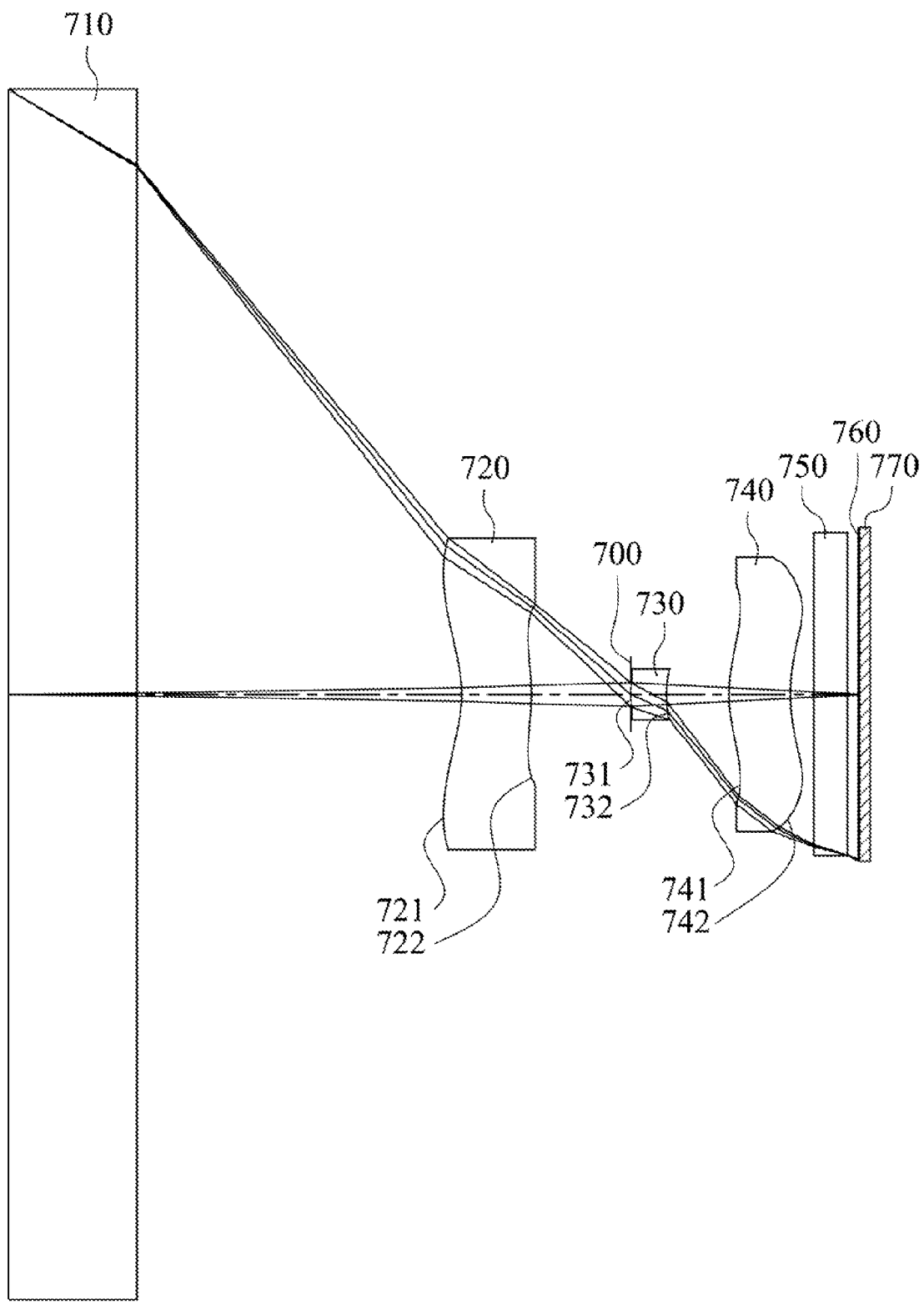
FIG. 7 is a schematic view of an image capturing array system according to the 1st example of the present disclosure.
Figure 8:
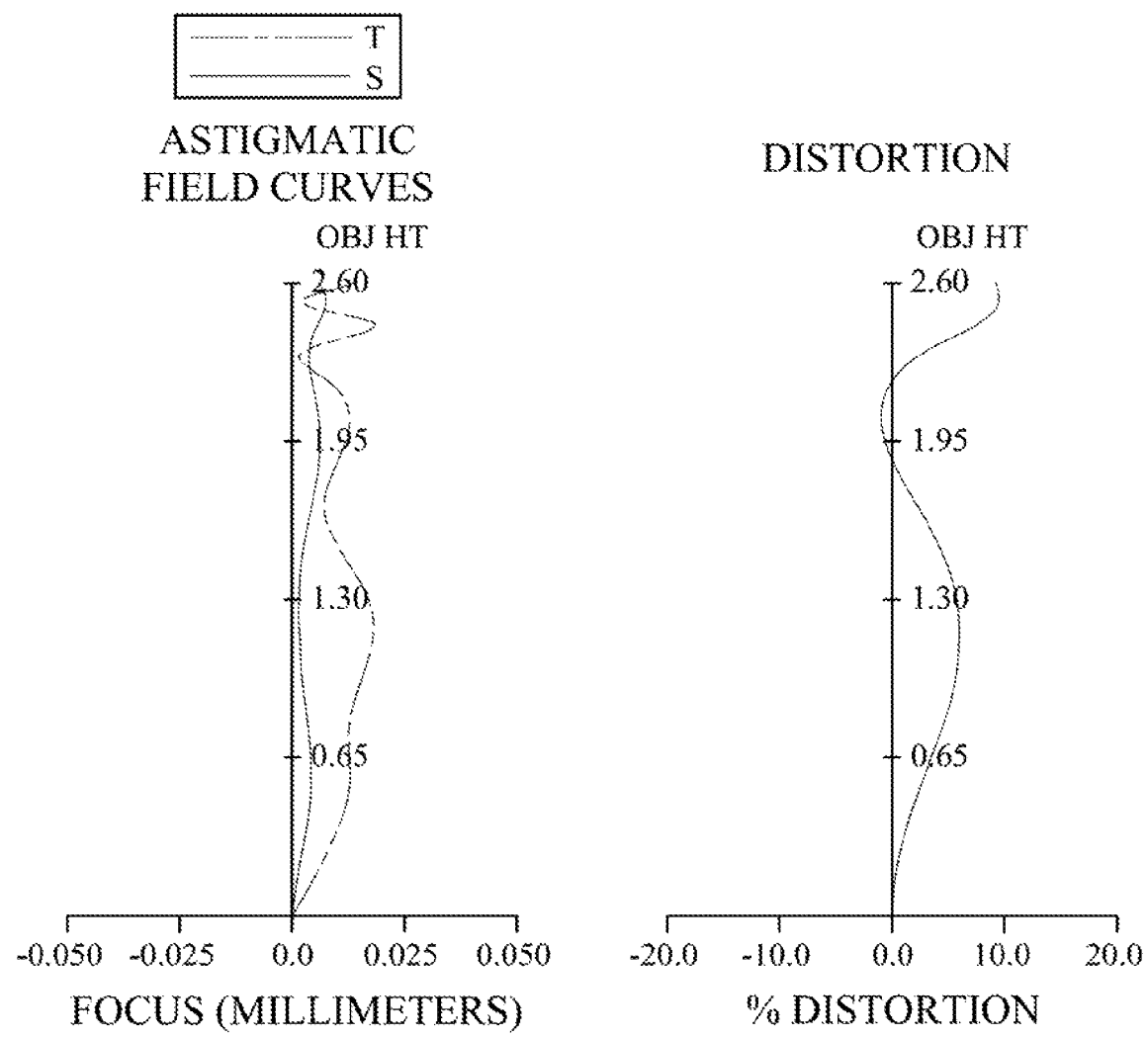
FIG. 8 shows astigmatic field curves and a distortion curve of the image capturing array system according to the 1st example.

FIG. 7 is a schematic view of an image capturing array system according to the 1st example of the present disclosure. FIG. 8 shows astigmatic field curves and a distortion curve of the image capturing array system according to the 1st example. In FIG. 7, the image capturing array system includes, in order from an object side to an image side, a cover-glass 710, nine image lens units (not otherwise herein labeled) and nine image sensors 770. An object is relatively stationary with respect to the image lens units during an image capturing process. The image lens units are identical. The image sensors 770 are identical. In FIG. 7, only one of the image lens units and only one of the image sensors 770 are illustrated for conciseness. Moreover, the following description will only mention one of the image lens units, and one of the image sensors 770 for conciseness.

The image lens units includes, in order from the object side to the image side, a first lens element 720, an aperture stop 700, a second lens element 730, a third lens element 740, an IR-cut filter 750 and an image plane 760, wherein the image lens units has a total of three lens elements (720-740) with refractive power.

The cover-glass 710 is made of glass and located between the object and the first lens element 720, and does not affect a focal length of the image lens unit.

The first lens element 720 with negative refractive power has a concave object-side surface 721 and a convex image-side surface 722, which are both aspheric, and the first lens element 720 is made of plastic material.

The second lens element 730 with positive refractive power has a convex object-side surface 731 and a concave image-side surface 732, which are both aspheric, and the second lens element 730 is made of plastic material.

The third lens element 740 with positive refractive power has a convex object-side surface 741 and a concave image-side surface 742, which are both aspheric, and the third lens element 740 is made of plastic material. Furthermore, the image-side surface 742 of the third lens element 740 has at least one inflection point.

The IR-cut filter 750 is made of glass and located between the third lens element 740 and the image plane 760, and does not affect the focal length of the image lens unit.

The image sensor 770 is disposed on the image plane 760 of the image lens unit.

The equation of the aspheric surface profiles of the aforementioned lens elements of the 1st embodiment is expressed as follows:

$$X(Y) = (Y^2/R)/(1+sqrt(1-(1+k)\times(Y/R)^2)) + \sum_i (Ai)\times(Y^i),$$

where,

X is the relative distance between a point on the aspheric surface spaced at a distance Y from the optical axis and the tangential plane at the aspheric surface vertex on the optical axis;

Y is the vertical distance from the point on the aspheric surface to the optical axis;

R is the curvature radius;

k is the conic coefficient; and

Ai is the i-th aspheric coefficient.

In the image lens unit of the image capturing array system according to the 1st example, when a focal length of the image lens unit is f, an f-number of the image lens unit is Fno, and a half of a maximal field of view of the image lens unit is HFOV, these parameters have the following values: f=0.45 mm; Fno=7.60; and HFOV=50.9 degrees.

In the image capturing array system according to the 1st example, the nine image lens units are arranged on a same plane as matrix. When a number of columns of the matrix is X and a number of rows of the matrix is Y, the following conditions are satisfied: X=3; and Y=3.

In the image capturing array system according to the 1st example, the image capturing array system further includes an image capturing window. The image capturing window is defined by an imaging area of the image capturing array system. When a length of a minimal rectangular area circumscribing the image capturing window is L, and a width of the minimal rectangular area circumscribing the image capturing window is W, the following condition is satisfied: L/W=1.33.

Figure 11:
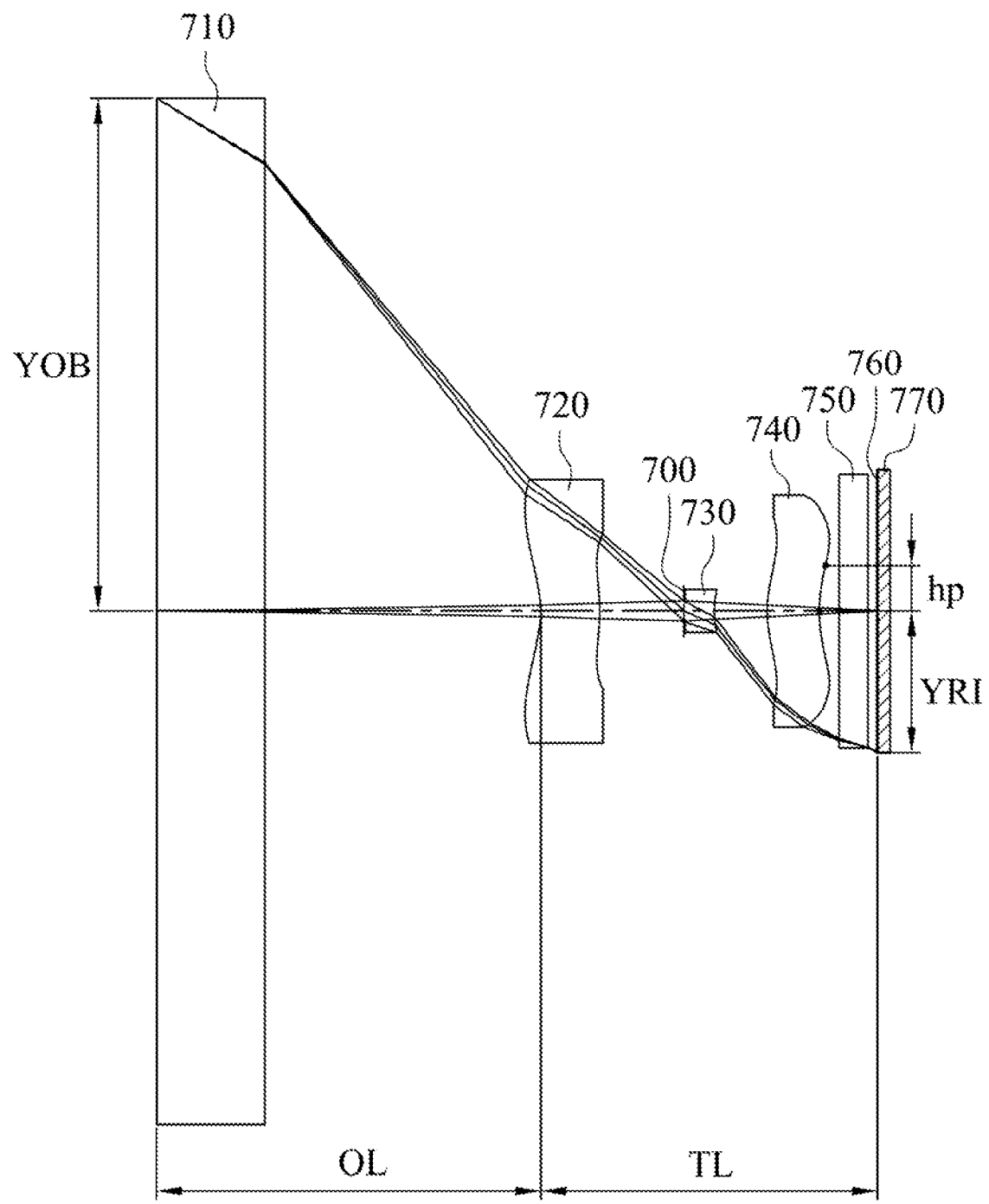
FIG. 11 is a schematic view showing parameters of the image capturing array system shown in FIG. 7.

FIG. 11 is a schematic view showing parameters of the image capturing array system shown in FIG. 7. In FIG. 11, when an object height of the image lens unit is YOB, and an image height of the image lens unit is YRI, the following condition is satisfied: YOB/YRI=3.62.

In the image lens unit of the image capturing array system according to the 1st example, when a focal length between the object and the aperture stop 700 is fF, and a focal length between the aperture stop 700 and the image plane 760 is fR, the following condition is satisfied: fR/fF=−0.21. In other words, fF is a focal length of a front lens group composed of the first lens element 720, and fR is a focal length of a rear lens group composed of the second lens element 730 and the third lens element 740.

In FIG. 11, when a vertical distance between the inflection point on the image-side surface 742 of the third lens element 740 and an optical axis is hp, and the object height of the image lens unit is YOB, the following condition is satisfied: hp/YOB=0.09.

In the image lens unit of the image capturing array system according to the 1st example, when a minimal distortion of the image lens unit is DISTmin, the following condition is satisfied: DISTmin=−0.94%.

In FIG. 11, when an axial distance between the object and the object-side surface 721 of the first lens element 720 along an optical axis is OL, and an axial distance between the object-side surface 721 of the first lens element 720 and the image plane 760 along the optical axis is TL, the following condition is satisfied: OL+TL=3.65 mm.

In FIG. 11, when the axial distance between the object and the object-side surface 721 of the first lens element 720 along the optical axis is OL, the axial distance between the object-side surface 721 of the first lens element 720 and the image plane 760 along the optical axis is IL, and the half of the maximal field of view of the image lens unit is HFOV, the following condition is satisfied: (OL+TL)/tan(HFOV)=2.97 mm.

The detailed optical data of the 1st example are shown in Table 1 and the aspheric surface data are shown in Table 2 below.

TABLE 1

1st example
f = 0.45 mm, Fno = 7.60, HFOV = 50.9 deg.

| Surface # | | Curvature Radius | | Thickness | Material | Index | Abbe # | Focal Length |
|---|---|---|---|---|---|---|---|---|
| 0 | Object | Plano | | 0.000 | | | | |
| 1 | Cover-glass | Plano | | 0.550 | Glass | 1.517 | 64.2 | — |
| 2 | | Plano | | 1.396 | | | | |
| 3 | Lens 1 | −0.455 | ASP | 0.298 | Plastic | 1.631 | 21.4 | −2.52 |
| 4 | | −0.798 | ASP | 0.427 | | | | |
| 5 | Ape. Stop | Plano | | −0.001 | | | | |
| 6 | Lens 2 | 0.274 | ASP | 0.155 | Plastic | 1.615 | 23.8 | 0.65 |
| 7 | | 0.693 | ASP | 0.267 | | | | |
| 8 | Lens 3 | 0.586 | ASP | 0.264 | Plastic | 1.527 | 56.3 | 2.83 |
| 9 | | 0.816 | ASP | 0.100 | | | | |
| 10 | IR-cut Filter | Plano | | 0.145 | Glass | 1.517 | 64.2 | — |
| 11 | | Plano | | 0.049 | | | | |
| 12 | Image | Plano | | — | | | | |

Note:
Reference wavelength is 850 nm.
Note:
The image lens units are arranged as a 3 × 3 matrix, and an imaging area of the image capturing array system is 12 mm × 9 mm.

TABLE 2

Aspheric Coefficients

| Surface # | 3 | 4 | 6 | 7 | 8 | 9 |
|---|---|---|---|---|---|---|
| k =   | −1.4240E+01 | −7.0000E+01 | −4.2251E−01 | −7.0000E+01 | −5.0251E−02 | 8.2387E−01 |
| A4 =  | 4.2908E−01  | 1.4192E+00  | 6.8899E+00  | 4.9933E+01  | −6.7626E+00 | −5.6911E−01 |
| A6 =  | −7.7375E−02 | 8.4185E+00  | 5.9591E+02  | −2.6935E+03 | 5.8023E+01  | −1.4900E+01 |
| A8 =  | 7.3466E−01  | −8.2902E+01 | 6.4525E+04  | 3.1043E+05  | −8.0557E+02 | 1.4857E+01 |
| A10 = | −7.9099E−01 | 4.3188E+02  | −6.0356E+07 | −2.1261E+07 | 6.9044E+03  | −1.0259E+01 |
| A12 = | 5.9340E−11  | 3.1896E−11  | 5.5131E+09  | 6.2401E+08  | −3.1636E+04 | 1.4350E+02 |
| A14 = | −5.5102E−13 | 3.2227E−11  | 1.0380E+05  | 1.6425E+05  | 6.8318E+04  | 7.1543E+02 |
| A16 = | −3.5387E−11 | −5.6015E−12 | 5.2621E+05  | −9.4447E+03 | −5.0302E+04 | −2.7803E+03 |

In Table 1 the curvature radius, the thickness and the focal length are shown in millimeters (mm). Surface numbers 0-12 represent the surfaces sequentially arranged from the object-side to the image-side along the optical axis. In Table 2, k represents the conic coefficient of the equation of the aspheric surface profiles. A1-A16 represent the aspheric coefficients ranging from the 1st order to the 16th order. The tables presented below for 2nd example are the corresponding schematic parameter and aberration curves, and the definitions of the tables are the same as Table 1 and Table 2 of the 1st example. Therefore, an explanation in this regard will not be provided again.

2nd Example of the Image Capturing Array System

Figure 9:
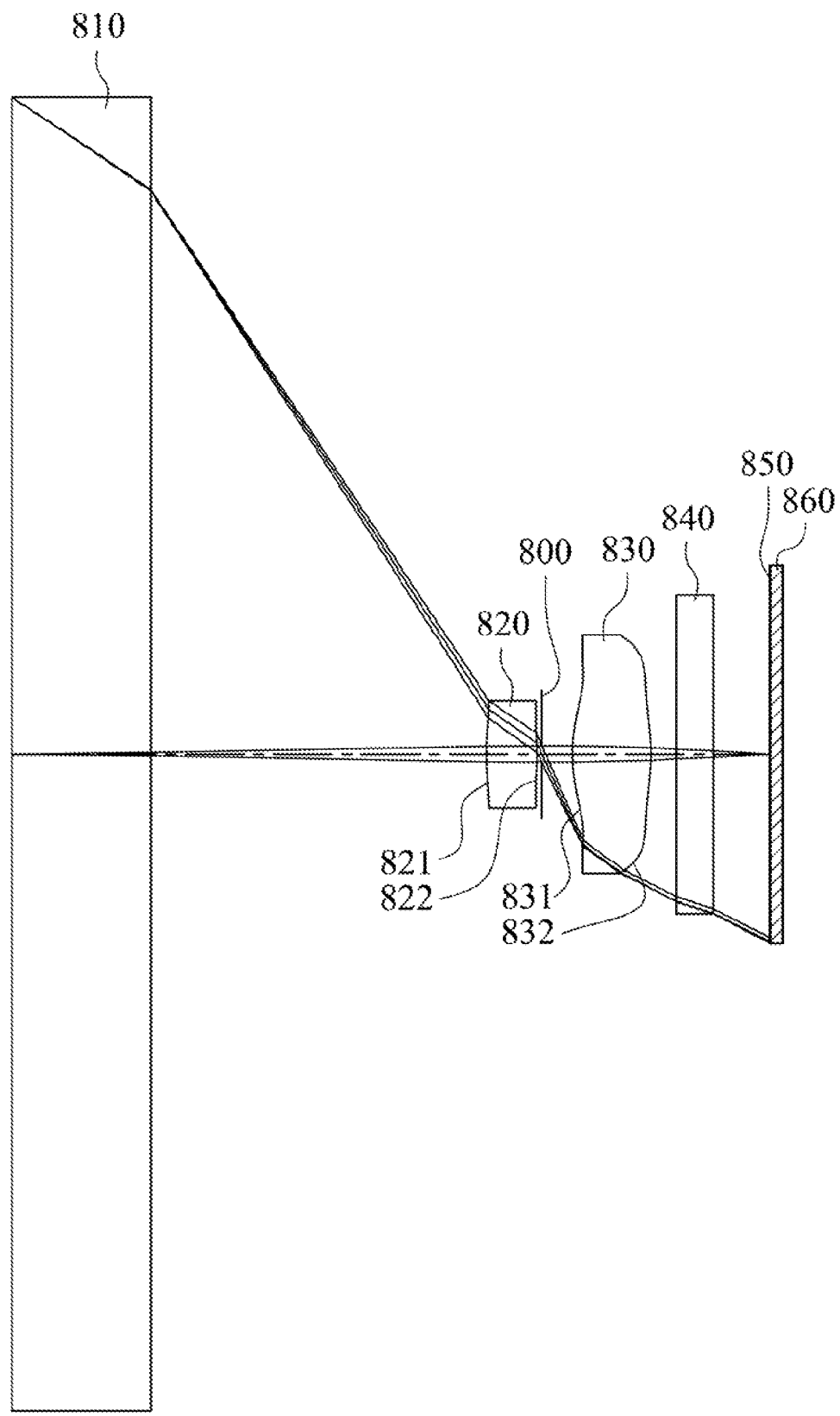
FIG. 9 is a schematic view of an image capturing array system according to 2nd example of the present disclosure.
Figure 10:
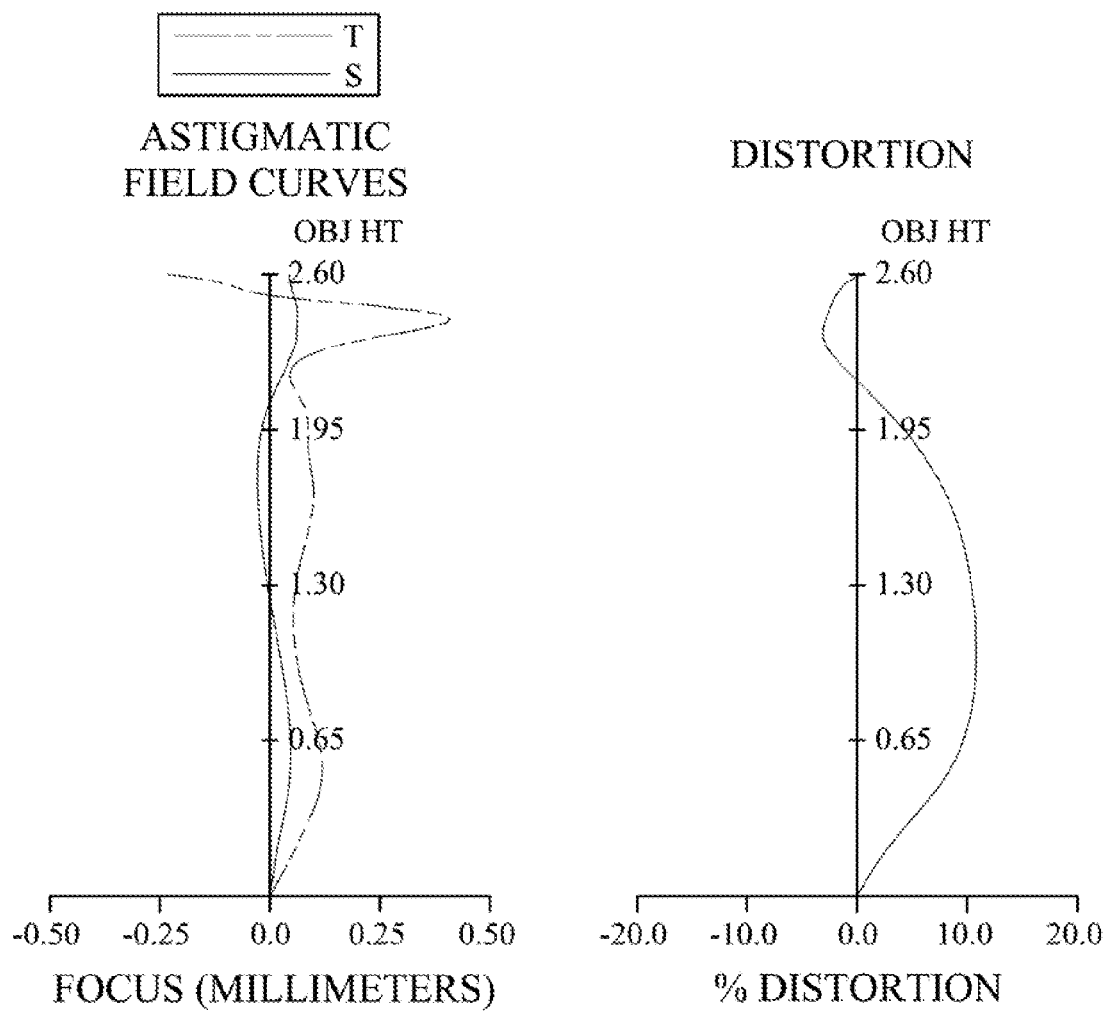
FIG. 10 shows astigmatic field curves at and a distortion curve of the image capturing array system according to 2nd example.

FIG. 9 is a schematic view of an image capturing array system according to 2nd example of the present disclosure. FIG. 10 shows astigmatic field curves and a distortion curve of the image capturing array system according to 2nd example. In FIG. 9, the image capturing array system includes, in order from an object side to an image side, a cover-glass 810, nine image lens units (not otherwise herein labeled) and nine image sensors 860. An object is relatively stationary with respect to the image lens units during an image capturing process. The image lens units are identical. The image sensors 860 are identical. In FIG. 9, only one of the image lens units and only one of the image sensors 860 are illustrated for conciseness. Moreover, the following description will only mention one of the image lens units and one of the image sensors 860 for conciseness.

The image lens units includes, in order from the object side to the image side, a first lens element 820, an aperture stop 800, a second lens element 830, an IR-cut filter 840 and an image plane 860, wherein the image lens units has a total of two lens elements (820-830) with refractive power.

The cover-glass 810 is made of glass and located between the object and the first lens element 820, and does not affect a focal length of the image lens unit.

The first lens element 820 with positive refractive power has a convex object-side surface 821 and a convex image-side surface 822, which are both aspheric, and the first lens element 820 is made of plastic material.

The second lens element 830 with positive refractive power has a convex object-side surface 831 and a convex image-side surface 832, which are both aspheric, and the second lens element 830 is made of plastic material. Furthermore, the image-side surface 832 of the second lens element 830 has at least one inflection point.

The IR-cut filter 840 is made of glass and located between the second lens element 830 and the image plane 850, and does not affect the focal length of the image lens unit.

The image sensor 860 is disposed on the image plane 850 of the image lens unit.

The detailed optical data of the 2nd example are shown in Table 3 and the aspheric surface data are shown in Table 4 below.

TABLE 3

2nd Example
f = 0.45 mm, Fno = 7.40, HFOV = 56.9 deg.

| Surface # | | Curvature Radius | | Thickness | Material | Index | Abbe # | Focal Length |
|---|---|---|---|---|---|---|---|---|
| 0 | Object | Plano | | 0.000 | | | | |
| 1 | Cover-glass | Plano | | 0.550 | Glass | 1.517 | 64.2 | — |
| 2 | | Plano | | 1.329 | | | | |
| 3 | Lens 1 | 2.459 | ASP | 0.198 | Plastic | 1.536 | 56.5 | 1.54 |
| 4 | | −1.205 | ASP | 0.020 | | | | |
| 5 | Ape. Stop | Plano | | 0.120 | | | | |
| 6 | Lens 2 | 0.600 | ASP | 0.312 | Plastic | 1.619 | 23.3 | 0.50 |
| 7 | | −0.523 | ASP | 0.100 | | | | |
| 8 | IR-cut Filter | Plano | | 0.145 | Glass | 1.517 | 64.2 | — |
| 9 | | Plano | | 0.226 | | | | |
| 10 | Image | Plano | | — | | | | |

Note:
Reference wavelength is 850 nm.
Note:
The image lens units are arranged as a 3 × 3 matrix, and an imaging area of the image capturing array system is 12 mm × 9 mm.

TABLE 4

Aspheric Coefficients

| Surface # | 3 | 4 | 6 | 7 |
|---|---|---|---|---|
| k = | 9.6808E+00 | −6.9750E+01 | 1.3937E+00 | −7.0000E+01 |
| A4 = | 6.3835E+00 | 4.9613E+01 | −6.2466E+00 | −4.5485E−01 |
| A6 = | −2.3218E+02 | −2.6376E+04 | 2.7450E+01 | 4.8006E+01 |
| A8 = | 1.3802E+03 | 5.8823E+06 | 4.3886E+01 | −5.1638E+02 |
| A10 = | 5.2416E+04 | −6.4500E+08 | −6.0441E+03 | 1.4437E+03 |
| A12 = | −1.0806E+06 | 2.7811E+10 | −6.4346E+03 | 3.1729E+03 |
| A14 = | −2.0098E+04 | 1.6494E+05 | 6.1435E+05 | −3.2575E+04 |
| A16 = | 1.0699E+08 | −9.3282E+03 | −2.6325E+06 | 6.5838E+04 |

In the 2nd example, the equation of the aspheric surface profiles of the aforementioned lens elements is the same as the equation of the 1st embodiment. Also, the definitions of these parameters shown in the following table are the same as those stated in the 1st example with corresponding values for the 2nd example, so an explanation in this regard will not be provided again.

Moreover, these parameters can be calculated from Table 3 and Table 4 as the following values and satisfy the following conditions:

| 2nd Example | | | |
|---|---|---|---|
| f [mm] | 0.45 | YOB/YRI | 3.48 |
| Fno | 7.40 | fR/fF | 0.33 |
| HFOV [deg.] | 56.9 | hp/YOB | 0.05/0.10/0.18 |
| X | 3 | DISTmin | −3.10% |
| Y | 3 | OL + TL [mm] | 3.00 |
| L/W | 1.33 | (OL + TL)/tan(HFOV) [mm] | 1.96 |

Fingerprint Identification Device

A fingerprint identification device includes the aforementioned image capturing array system and a light source. The light source is disposed between the object and the image plane of each of the image lens units. Therefore, a compact size of the fingerprint identification device is obtained.

When a wavelength of the light source is λ, the following condition can be satisfied: 700 nm<λ<1000 nm. Therefore, the light source is invisible for human eyes, and a discomfort will not be caused thereby.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. An image capturing array system comprising, in order from an object side to an image side:
    at least two image lens units, and
    at least one image sensor disposed on an image plane of each of the image lens units;
    wherein each of the image lens units comprises at least one lens element with refractive power, an object-side surface and an image-side surface of the lens element are aspheric, and an object is relatively stationary with respect to the image lens units during an image capturing process;
    wherein in each of the image lens units, an object height of the image lens unit is YOB, an image height of the image lens unit is YRI, the lens element which is closest to the object is an first lens element, an axial distance between the object and an object-side surface of the first lens element along an optical axis is OL, an axial distance between the object-side surface of the first lens element and the image plane along the optical axis is TL, a half of a maximal field of view of the image lens unit is HFOV, and the following conditions are satisfied:

$2.0 < YOB/YRI$; and $(OL+TL)/\tan(HFOV) < 5$ mm.

2. The image capturing array system of claim 1, comprising at least three image lens units, wherein the image lens units are arranged on a same plane as a two-dimensional array.

3. The image capturing array system of claim 2, wherein the two-dimensional array is a matrix, a number of columns of the matrix is X, a number of rows of the matrix is Y, and the following conditions are satisfied:

$2 \leq X \leq 10$; and $2 \leq Y \leq 10$.

4. The image capturing array system of claim 3, wherein an image area of each of the image lens units is Ai, an overlapping image area between two of the image lens units is Aoi, and the following condition is satisfied:

$(Aoi/Ai) \times 100\% \leq 20\%$.

5. The image capturing array system of claim 3, further comprising a hole piece with a two-dimensional through holes array arranged by a plurality of through holes, wherein each of the through holes is corresponded to each of the image lens units.

6. The image capturing array system of claim 5, wherein each of the image lens units has at least one common element with a same functionality, and these common elements are formed into one unified piece.

7. The image capturing array system of claim 6, wherein each of the image lens units has two or three lens elements with refractive power.

8. The image capturing array system of claim 6, wherein in each of the image lens units, the image lens unit further comprises a stop, a focal length between an object and the stop is fF, a focal length between the stop and the image plane is fR, and the following condition is satisfied:

$-1.0 < fR/fF < 1.0$.

9. The image capturing array system of claim 6, wherein in each of the image lens units, the axial distance between the object and the object-side surface of the first lens element along the optical axis is OL, an axial distance between the object-side surface of the first lens element and the image plane along the optical axis is TL, and the following condition is satisfied:

$OL+TL < 5$ mm.

10. The image capturing array system of claim 6, wherein in each of the image lens units, a minimal distortion of the image lens unit is DISTmin, and the following condition is satisfied:

$-3.5\% < DISTmin$.

11. The image capturing array system of claim 6, wherein in each of the image lens units, an f-number of the image lens unit is Fno, the half of the maximal field of view of the image lens unit HFOV, and the following conditions are satisfied:

$4 < Fno$; and $45$ degrees $< HFOV$.

12. The image capturing array system of claim 6, wherein in each of the image lens units, an image-side surface of the lens element which is closest to the image plane has at least one inflection point, a vertical distance between the inflection point on the image-side surface of the lens element and the optical axis is hp, the object height of the image lens unit is YOB, and the following condition is satisfied:

$0 < hp/YOB < 0.3$.

13. The image capturing array system of claim 1, further comprising:
an image capturing window, the image capturing window is defined by an imaging area of the image capturing array system, a length of a minimal rectangular area circumscribing the image capturing window is L, a width of the minimal rectangular area circumscribing the image capturing window is W, and the following condition is satisfied:

$0.5 < L/W < 2$.

14. The image capturing array system of claim 13, wherein each of the image lens units has two or three lens elements with refractive power.

15. The image capturing array system of claim 14, wherein in each of the image lens units, the axial distance between the object and the object-side surface of the first lens element along the optical axis is OL, an axial distance between the object-side surface of the first lens element and the image plane along the optical axis is TL, and the following condition is satisfied:

$OL+TL < 5$ mm.

16. The image capturing array system of claim 14, wherein in each of the image lens units, a minimal distortion of the image lens unit is DISTmin, and the following condition is satisfied:

$-3\% < DISTmin$.

17. The image capturing array system of claim 14, wherein in each of the image lens units, an f-number of the image lens unit is Fno, the half of the maximal field of view of the image lens unit is HFOV, and the following conditions are satisfied:

$4 < Fno$; and $45$ degrees $< HFOV$.

18. The image capturing array system of claim 14, wherein in each of the image lens units, the image-side surface of the lens element which is closest to the image plane has at least one inflection point, a vertical distance between the inflection point on the image-side surface of the lens element and the optical axis is hp, the object height of the image lens unit is YOB, and the following condition is satisfied:

$0 < hp/YOB < 0.3$.

19. A fingerprint identification device, comprising:
the image capturing array system of claim 1; and
a light source, the light source is disposed between the object and the image plane of each of the image lens units.

20. The fingerprint identification device of claim 19, wherein a wavelength of the light source is λ, and the following condition is satisfied:

$700$ nm $< λ < 1000$ nm.

* * * * *